United States Patent
Murakami

(10) Patent No.: US 6,234,392 B1
(45) Date of Patent: *May 22, 2001

(54) APPARATUS FOR ISSUING AND/OR READING RECORDING MEDIUM AND RECORDING MEDIUM RECORDED WITH DIGITALLY CODED SIGNAL

(75) Inventor: Katuyuki Murakami, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,246

(22) Filed: Feb. 24, 1998

(30) Foreign Application Priority Data

Oct. 8, 1997 (JP) .................................................. 9-275449

(51) Int. Cl.[7] .............................. G06K 5/04; G06K 7/10; G06K 9/00
(52) U.S. Cl. ........................................ 235/462.12; 235/494
(58) Field of Search .............................. 235/462.12, 494, 235/454, 462.01, 487, 493; 382/181, 182, 183, 232

(56) References Cited

U.S. PATENT DOCUMENTS

| | | | |
|---|---|---|---|
| 4,263,504 | * 4/1981 | Thomas | 235/454 |
| 4,711,996 | * 12/1987 | Drexler | 235/454 X |
| 4,902,880 | * 2/1990 | Garczynski et al. | 235/375 |
| 5,278,398 | * 1/1994 | Pavlidis et al. | 235/462.12 |
| 5,288,986 | * 2/1994 | Pine et al. | 235/494 |
| 5,481,103 | * 1/1996 | Wang | 235/494 |
| 5,504,322 | * 4/1996 | Pavlidis et al. | 235/494 |
| 5,686,718 | * 11/1997 | Iwai et al. | 235/494 |
| 5,694,102 | * 12/1997 | Hecht | 235/456 |
| 5,811,787 | * 9/1998 | Schuessler et al. | 235/494 |
| 5,874,718 | * 2/1999 | Matsui | 235/494 |
| 5,936,228 | * 8/1999 | Yoshihara | 235/494 |

FOREIGN PATENT DOCUMENTS

| | | |
|---|---|---|
| 5-039199 | 2/1993 | (JP) . |
| 6-282696 | 10/1994 | (JP) . |
| 92/16933 | * 10/1992 | (WO) . |

* cited by examiner

Primary Examiner—Karl D. Frech
Assistant Examiner—Jared J. Fureman
(74) Attorney, Agent, or Firm—Staas & Halsey LLP

(57) ABSTRACT

An apparatus for issuing a recording medium recorded with digitally coded signals, is provided with a data processor for dividing digital data into a plurality of blocks, multiplexing the blocks and arranging multiplexed blocks in predetermined combination patterns, and a printer for recording on the recording medium, as the digitally coded signals, the multiplexed blocks arranged in the predetermined combination patterns and received from the data processor.

23 Claims, 9 Drawing Sheets

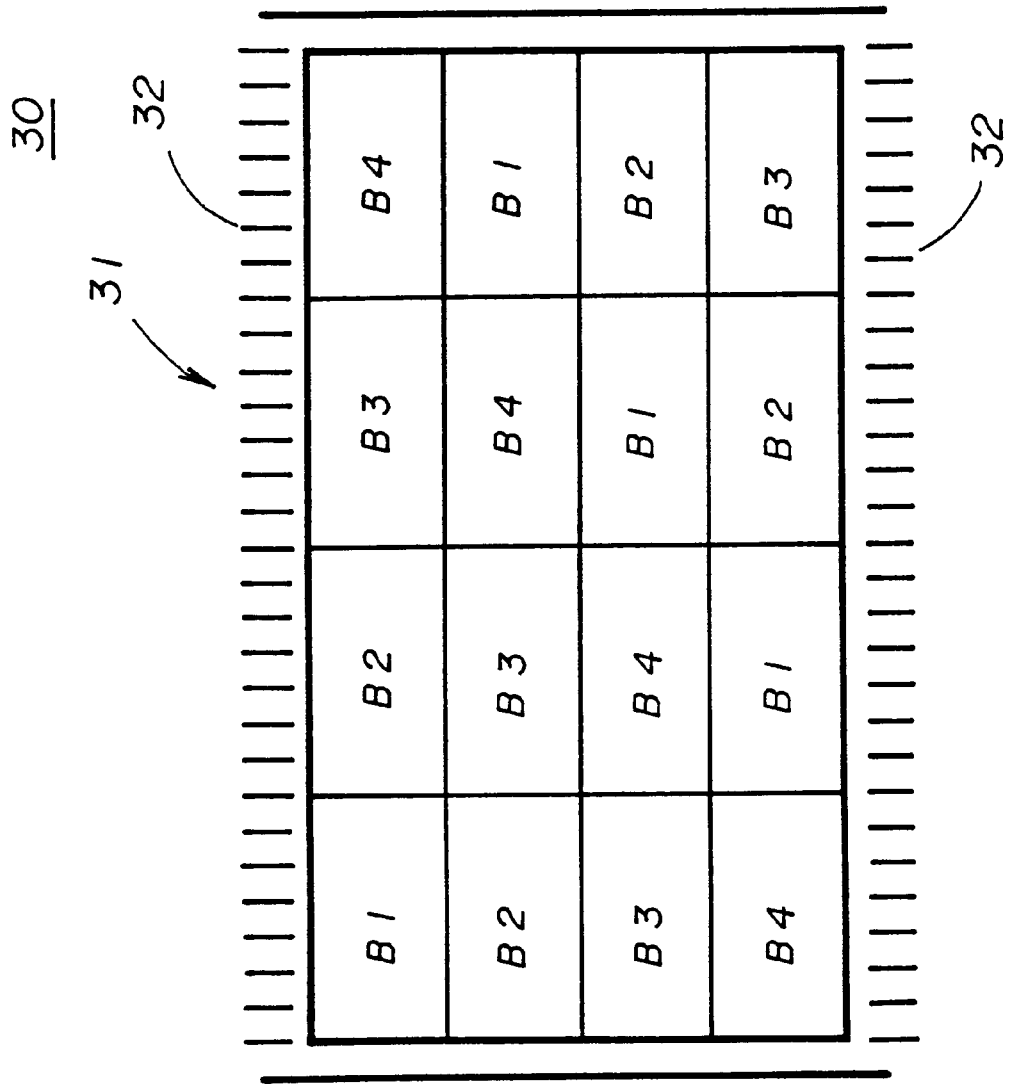

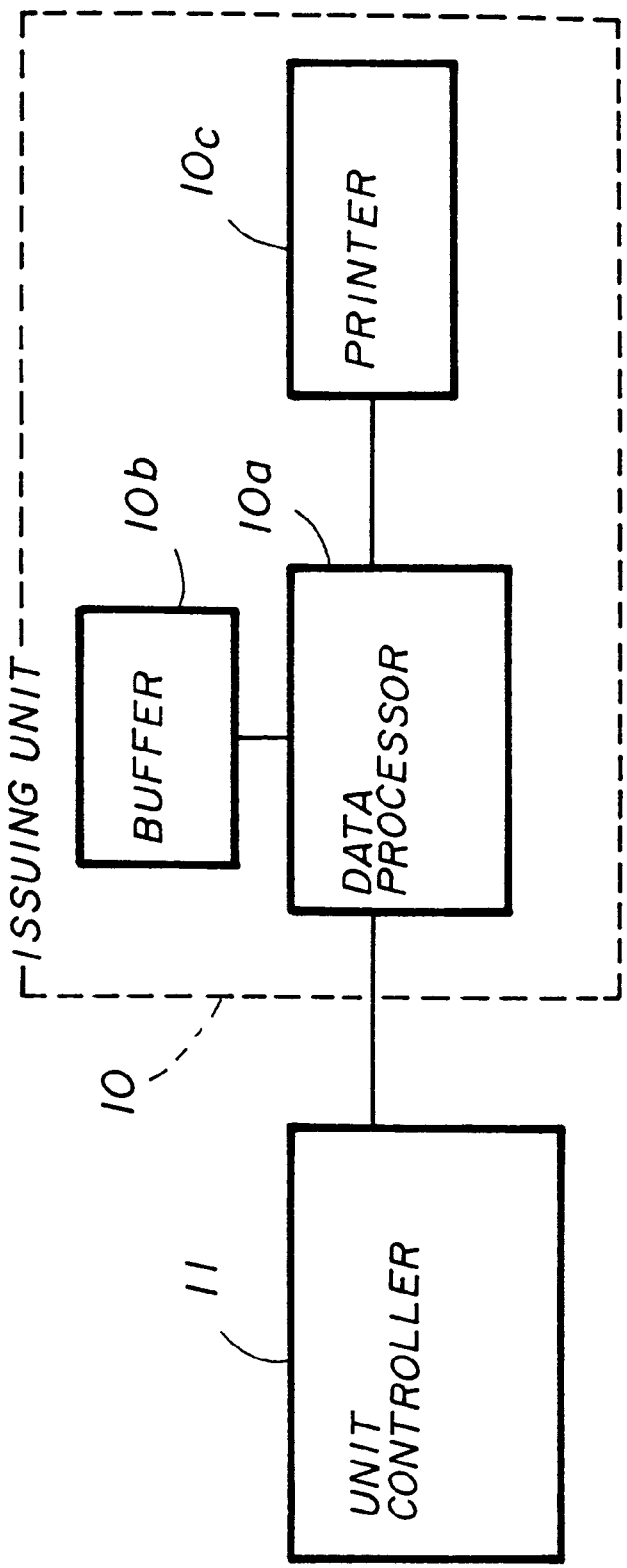

APPARATUS FOR ISSUING AND/OR READING RECORDING MEDIUM AND RECORDING MEDIUM RECORDED WITH DIGITALLY CODED SIGNAL

BACKGROUND OF THE INVENTION

The present invention generally relates to apparatuses for issuing and/or reading recording mediums and recording mediums, and more particularly to an apparatus for issuing and/or reading a recording medium which is recorded with digitally coded signals, and to such a recording medium recorded with digitally coded signals.

Digitally coded signals, such as bar codes, are often recorded on recording mediums such as pool tickets used in races such as horse racing, bicycle racing and automobile racing, lottery tickets, and various kinds of cards such as voting cards. A description will be given of an example of a pool ticket which is used in races such as horse racing, bicycle racing and automobile racing, and is recorded with bar codes.

FIG. 1 is a diagram showing an example of a pool ticket recorded with bar codes. As shown in FIG. 1, information such as the site of the race, the date and number of the race, the name of the race and the number assigned to the horse, bicycle, automobile or the like are printed on a surface of a pool ticket 100 in characters, numerals and symbols, and the information is also recorded in a bar code region 101 on the ticket surface in the form of digital data, that is, bar codes. Time slots 102 are recorded above and below the bar code region 101 for the purposes of generating a timing signal when reading the data from the pool ticket 100. Bar code data are recorded in a region of the bar code region 101 between the time slots 102.

Normally, the pool ticket 100 is issued from a ticket issuing apparatus which prints data on the pool ticket 100 depending on information input by a customer when making the bet. In addition, the pool ticket 100 is automatically read by a ticket reading apparatus which reads the bar codes printed on the pool ticket 100 when making a pay-off with respect to a winning pool ticket.

However, in most cases, the bar codes recorded on the pool ticket 100 are not multiplexed. For this reason, there were problems in that the ticket reading apparatus will make an erroneous recognition or may not be able to read the data from the pool ticket 100 when a portion of the bar code is stained or missing.

SUMMARY OF THE INVENTION

Accordingly, it is a general object of the present invention to provide a novel and useful apparatus for issuing and/or reading a recording medium which is recorded with digitally coded signals, and to provide such a recording medium recorded with digitally coded signals, by which the problems described above are eliminated.

Another and more specific object of the present invention is to provide an apparatus for issuing and/or reading a recording medium, and to a recording medium recorded with digitally coded signals, which can prevent an erroneous recognition and prevent a situation where digitally coded signals cannot be read from the recording medium, even when a portion of the digitally coded signals is stained or missing, by multiplexing the digitally coded signal such as bar code data recorded on the recording medium.

Still another object of the present invention is to provide an apparatus for issuing a recording medium recorded with digitally coded signals, comprising processing means for dividing digital data into a plurality of blocks, multiplexing the blocks and arranging multiplexed blocks in predetermined combination patterns, and recording means, coupled to the processing means, for recording on the recording medium, as the digitally coded signals, the multiplexed blocks arranged in the predetermined combination patterns and received from the processing means. According to the apparatus of the present invention, it is possible to prevent an erroneous recognition and to prevent a situation where the digitally coded signals cannot be read from the recording medium, even when a portion of the digitally coded signals is stained or missing, because the digitally coded signals such as bar code data are multiplexed and recorded on the recording medium. Hence, the reading capability and reliability of an apparatus which reads the digitally coded signals from the recording medium are improved.

A further object of the present invention is to provide an apparatus for reading digitally coded signals from a recording medium, comprising reading means for reading from the recording medium the digitally coded signals comprising digital data which are divided into a plurality of blocks, multiplexed and multiplexed data are arranged in predetermined combination patterns, and processing means, coupled to the reading means, for reproducing the digital data from the digitally coded signals received from the reading means by extracting the blocks and rearranging the extracted blocks. According to the apparatus of the present invention, it is possible to prevent an erroneous recognition and to prevent a situation where the digitally coded signals cannot be read from the recording medium, even when a portion of the digitally coded signals is stained or missing, because the digitally coded signals such as bar code data are multiplexed and recorded on the recording medium. Thus, the reading capability and reliability of the apparatus are improved.

Another object of the present invention is to provide a recording medium comprising a data region, and digitally coded signals recorded in the data region, where the digitally coded signals comprise digital data which are divided into a plurality of blocks, multiplexed and multiplexed data are arranged in predetermined combination patterns. According to the recording medium of the present invention, it is possible to prevent an erroneous recognition and to prevent a situation where the digitally coded signals cannot be read from the recording medium, even when a portion of the digitally coded signals is stained or missing, because the digitally coded signals such as bar code data are multiplexed and recorded on the recording medium. Hence, the reading capability and reliability of an apparatus which reads the digitally coded signals from the recording medium are improved.

Other objects and further features of the present invention will be apparent from the following detailed description when read in conjunction with the accompanying drawings.

BRIEF DESCRIPTION OF THE DRAWINGS

FIG. 3 is a diagram for explaining an arrangement of bar code data on an embodiment of a recording medium/ according to the present invention;

FIG. 6 is a system block diagram showing an embodiment of the recording medium issuing apparatus according to the present invention;

DESCRIPTION OF THE PREFERRED EMBODIMENTS

Figure 2A:
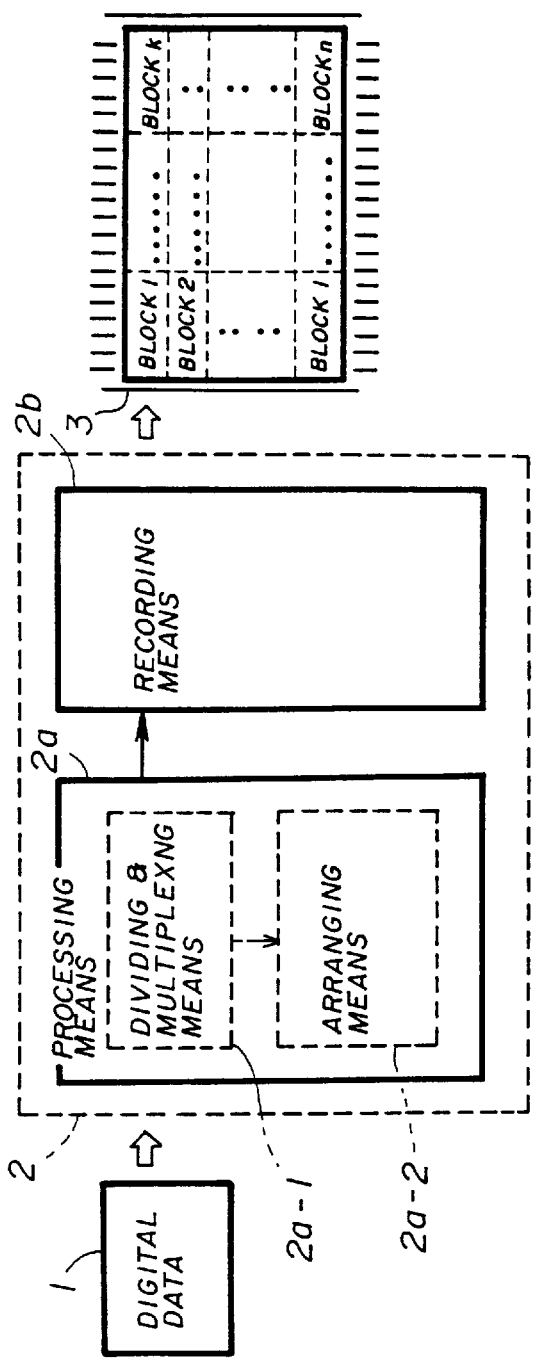
FIG. 2A is a diagram for explaining the operating principle of a recording medium issuing apparatus according to the present invention.

First, a description will be given of the operating principle of the present invention, by referring to FIGS. 2A and 2B. FIG. 2A is a diagram for explaining the operating principle of a recording medium issuing apparatus according to the present invention, and FIG. 2B is a diagram for explaining the operating principle of a recording medium reading apparatus according to the present invention.

As shown in FIG. 2A, a recording medium issuing apparatus 2 includes a processing means 2a and a recording means 2b. The processing means 2a may be realized by a central processing unit (CPU), for example, and includes a means 2a-1 for dividing digital data 1 into a plurality of blocks and multiplexing the blocks, and a means 2a-2 for arranging the multiplexed blocks in predetermined combination patterns. The recording means 2b records on a recording medium as digitally coded signals the digital data 1 which are divided into the blocks and multiplexed by the means 2a-1 of the processing means 2a and are arranged in the predetermined combination patterns by the means 2a-2 of the processing means 2a.

As a result, the digitally coded signals formed by the predetermined combination patterns of the multiplexed blocks are recorded on a digital code region 3 of the recording medium and the recording medium is issued from the recording medium issuing apparatus 2.

Figure 2B:
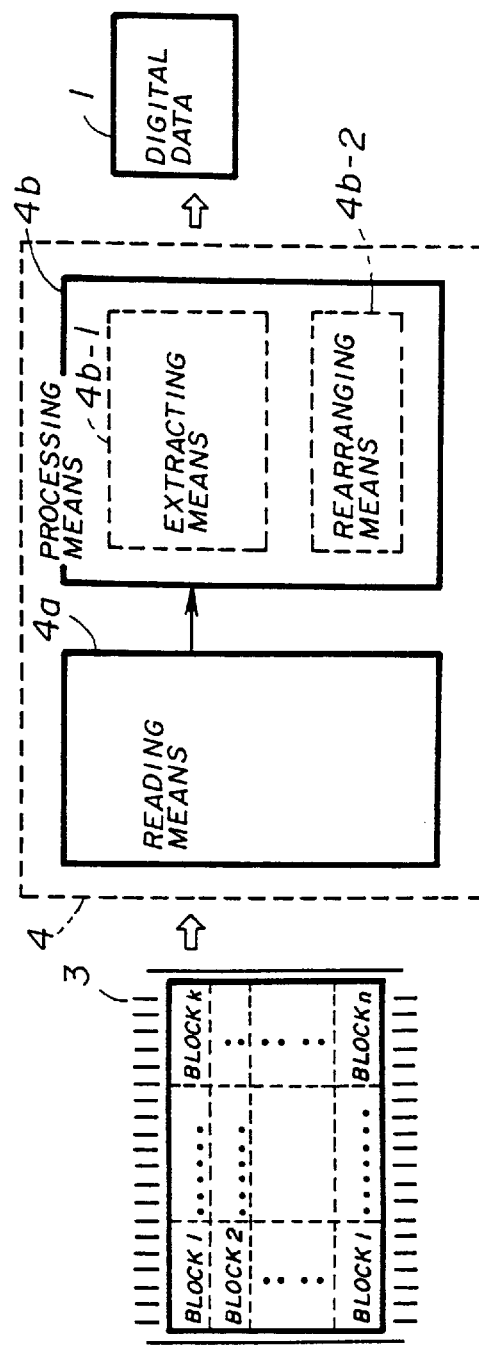
FIG. 2B is a diagram for explaining the operating principle of a recording medium reading apparatus according to the present invention.

On the other hand, as shown in FIG. 2B, a recording medium reading apparatus 4 includes a reading means 4a and a processing means 4b. The reading means 4a reads from the digital code region 3 of the recording medium the digital code signals which. are formed by the predetermined combination patterns of the multiplexed blocks. The processing means 4b may be realized by a CPU, for example, and includes a means 4b-1 for extracting from the digital code signals read by the reading means 4a. the blocks which are formed by correct data, and a means 4b-2 for rearranging the extracted blocks to reproduce the digital data 1.

Hence, the digital data 1 are reproduced by the recording medium reading apparatus 4.

Because the digital code signals recorded on the recording medium are formed by the predetermined combination patterns of the multiplexed blocks, it is possible to read the contents of a certain block recorded at a certain position on the recording medium even when an abnormality is generated in a portion of the block which is recorded at another position on the recording medium and has the same contents as the certain block. For this reason, it is possible to improve the data reading capability and reliability of the recording medium reading apparatus 4.

In addition, it is possible to further improve the data reading capability and reliability of the recording medium reading apparatus 4 by constructing the recording medium issuing apparatus 2 to arrange the multiplexed blocks on the recording medium so that even if specific blocks which are arranged in a vertical or horizontal line are damaged or stained and cannot be read correctly, it is possible to read the contents of the specific blocks from other blocks which have the same contents as the specific blocks.

FIG. 3 is a diagram for explaining an arrangement of bar code data on an embodiment of a recording medium according to the present invention. More particularly, FIG. 3 shows bar code data recorded in a bar code data region 31 of a ticket 30 corresponding to the bar code data region 101 of the ticket 100 shown in FIG. 1. Time slots 32 are provided above and below the bar code data region 31. For example, portions of the ticket 30 other than the bar code data region 31 may be the same as. those corresponding portions of the ticket 100 shown in FIG. 1, but is of course not limited to those corresponding portions of the ticket 100 shown in FIG. 1. The bar code data region 31 corresponds to the digital code region 3 shown in FIGS. 2A and 2B.

Figure 1:
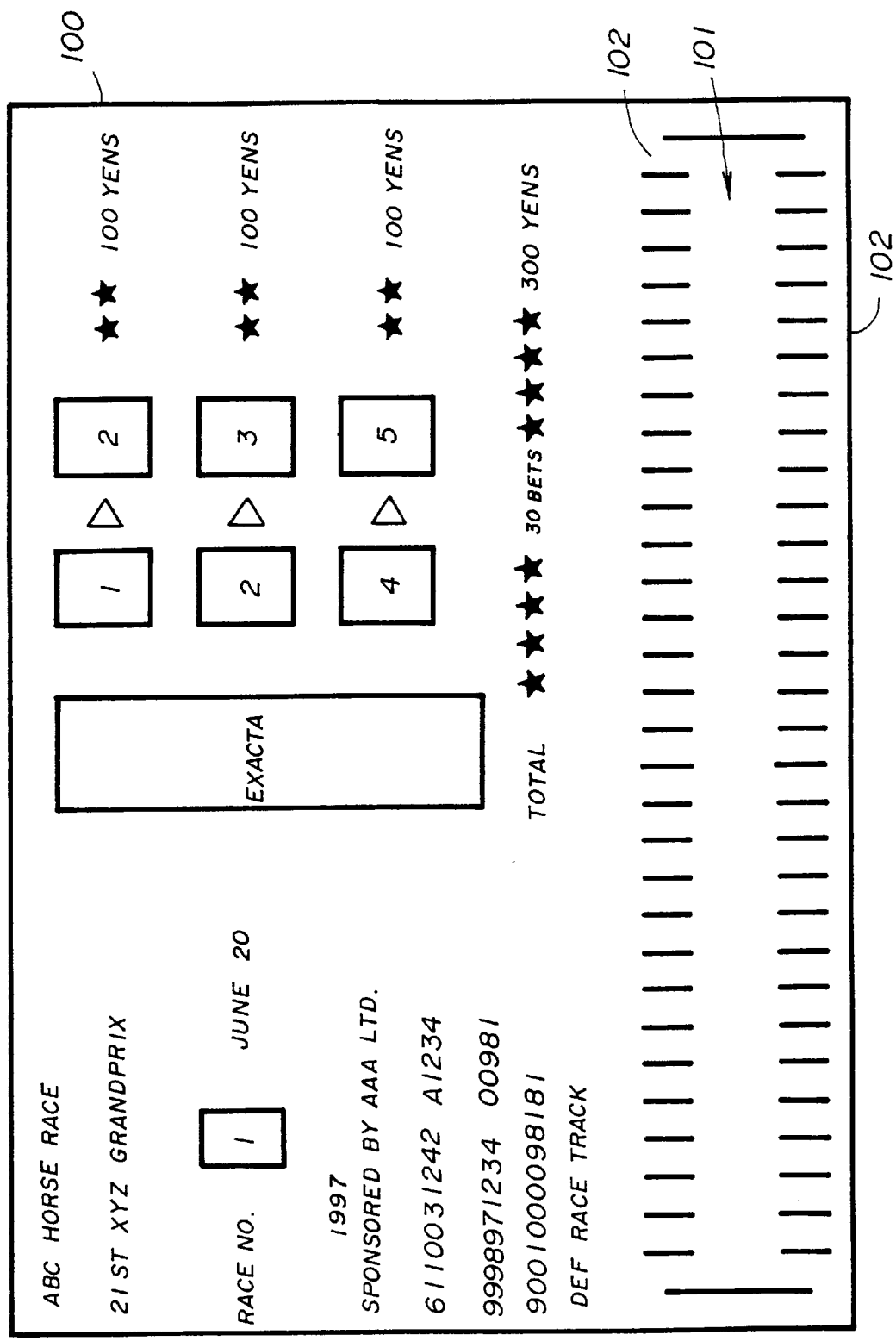
FIG. 1 is a diagram showing an example of a pool ticket recorded with bar codes.

Data formed by bar code data blocks B1 through B4 shown in FIG. 3 correspond to the bar code data recorded in the bar code data region 101 shown in FIG. 1. In this embodiment, the bar code data blocks B1 through B4 are multiplexed 4 times and recorded in the bar code data region 31 of the ticket 30, and the bar code data blocks B1 through B4 are arranged in predetermined combination patterns of 4 blocks.

Of course, the bar code data blocks may be multiplexed N times and recorded on the ticket 30 so that the bar code data blocks are arranged in predetermined combination patterns of N blocks, where N is an integer greater than 1, and N is not limited to 4 as in the above described embodiment.

Figure 4:
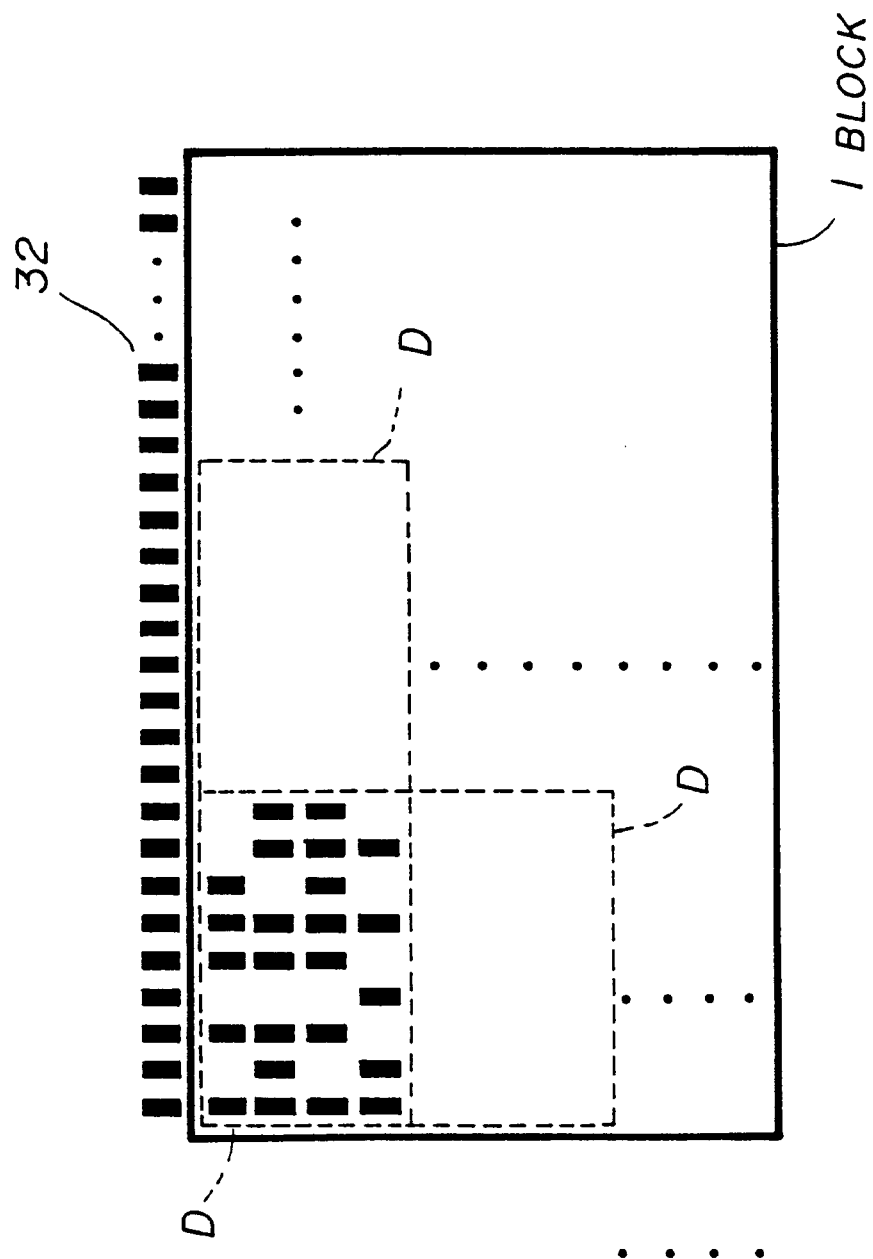
FIG. 4 is a diagram showing an arrangement of the bar code data within each block shown in FIG. 3.

FIG. 4 is a diagram showing an arrangement of the bar code data within each of the blocks B1 through B4 shown in FIG. 3. As shown in FIG. 4, a plurality of data portions D are arranged within one block, and each data portion D is made up of data amounting to a predetermined number of lines. In this particular case shown in FIG. 4, the data amounting to each line include a 8-bit data and a 1-bit parity.

Figure 5A:
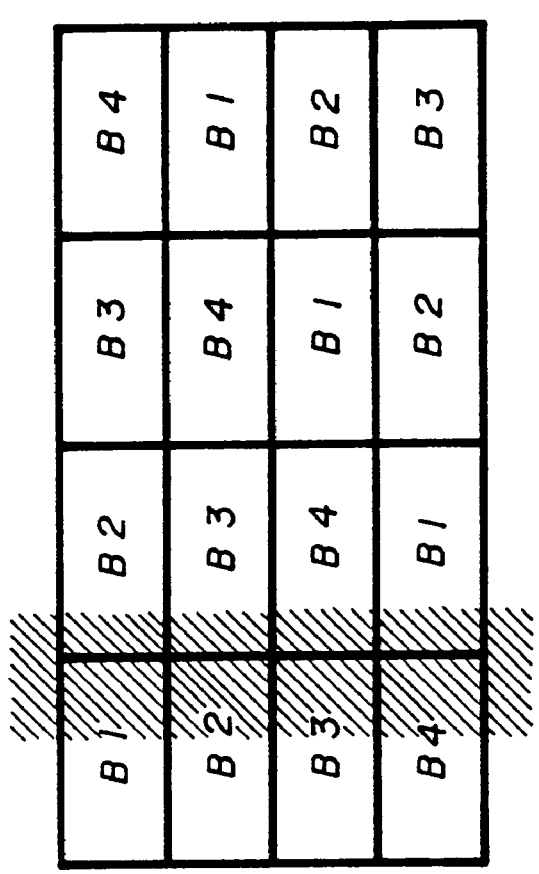
FIGS. 5A and 5B respectively are diagrams for explaining a case where a vertically extending portion and a horizontally extending portion of a bar code data region is damaged or stained.
Figure 5B:
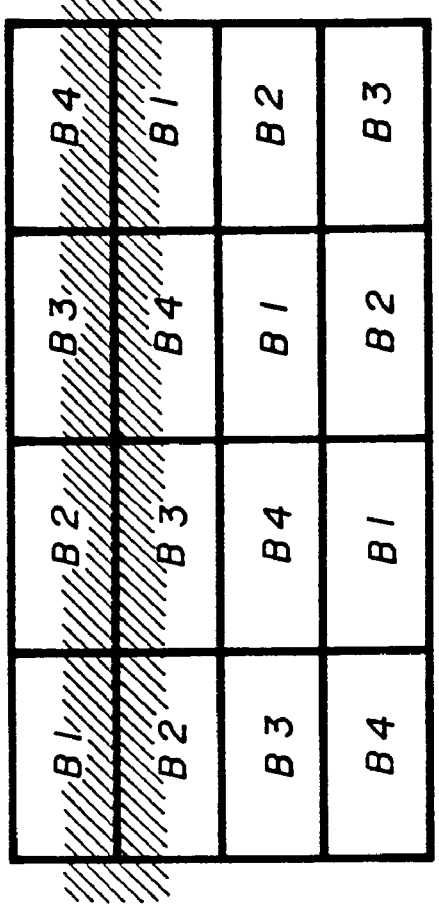

By dividing the bar code data into a plurality of blocks, multiplexing the blocks, and arranging the multiplexed blocks in the bar code data region 31 of the ticket 30 as described above, it becomes possible to read the correct bar code data even if a portion of the bar code data region 31 is damaged or stained. In a case shown in FIG. 5A where a vertically extending portion of the bar code data region 31 is damaged or stained as indicated by the hatching, it is still possible to read the correct bar code data because undamaged or unstained bar code data blocks B1 through B4 exist within the bar code data region 31. Similarly, in a case shown in FIG. 5B where a horizontally extending portion of the bar code data region 31 is damaged or stained as indicated by the hatching, it is still possible to read the correct bar code data because undamaged or unstained bar code data blocks B1 through B4 exist within the bar code data region 31.

FIG. 6 is a system block diagram showing an embodiment of the recording medium issuing apparatus according to the present invention. A ticket issuing apparatus shown in FIG. 6 includes an issuing unit 10 and a unit controller 11. The issuing unit 10 includes a data processor 10a, a data storage buffer 10b and a printer 10c.

The unit controller 11 supplies to the issuing unit 10 digital data recorded on a ticket 30 that is input by a customer or digital data input responsive to an operation made by an operator. The data processor 10a of the issuing unit 10 processes the digital data received from the unit controller 11. The data storage buffer 10b of the issuing unit 10 temporarily stores the digital data received from the unit controller 11. The printer 10c of the issuing unit 10 prints bar codes on the ticket 30. The issuing unit 10 divides the digital data, that is, the bar code data, received from the unit controller 11, multiplexes the blocks, and arranges the multiplexed blocks in the predetermined combination patterns to be printed on the ticket.

Figure 7:
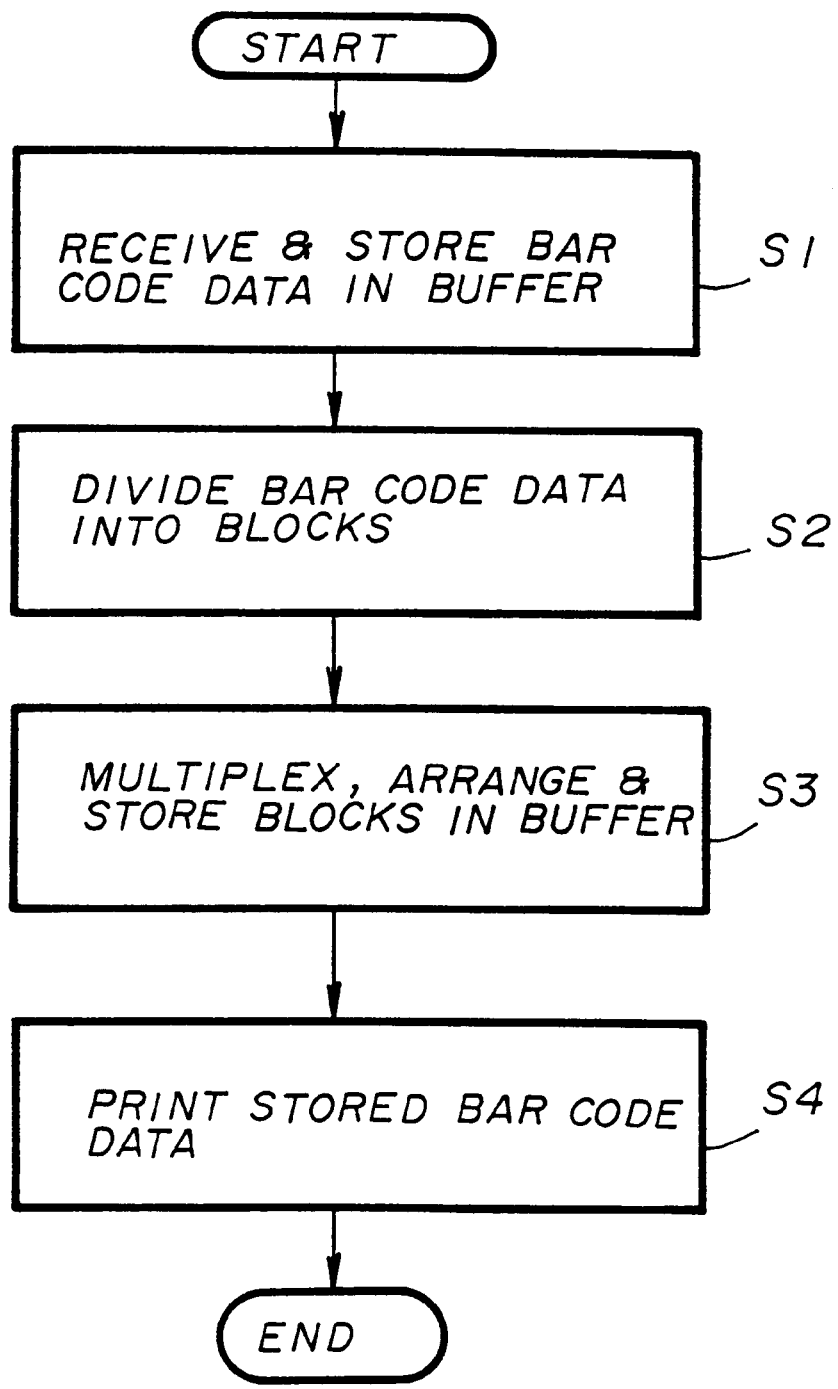
FIG. 7 is a flow chart for explaining the operation of the recording medium issuing apparatus shown in FIG. 6.

FIG. 7 is a flow chart for explaining the operation of the recording medium issuing apparatus shown in FIG. 6.

In a step S1, the data processor 10a receives the bar code data from the unit controller 11, and stores the bar code data in the data storage buffer 10b. In a step S2, the data processor 10a divides the bar code data into a plurality of blocks. For example, in the case shown in FIG. 3 described above, the bar code data are divided into 4 blocks B1 through B4.

In a step S3, the data processor 10a stores the blocks into the data storage buffer 10b while multiplexing the blocks and arranging the multiplexed blocks in the predetermined combination patterns. Then, in a step S4, the data processor 10a supplies to the printer 10c the bar code data in which the multiplexed blocks are arranged in the predetermined combination patterns after the arranging of the multiplexed blocks ends in the step S3. Hence, the printer 10c prints in the bar code data region 31 of the ticket 30 the bar code data in which the multiplexed blocks are arranged in the predetermined combination patterns such as those shown in FIG. 3.

Figure 8:
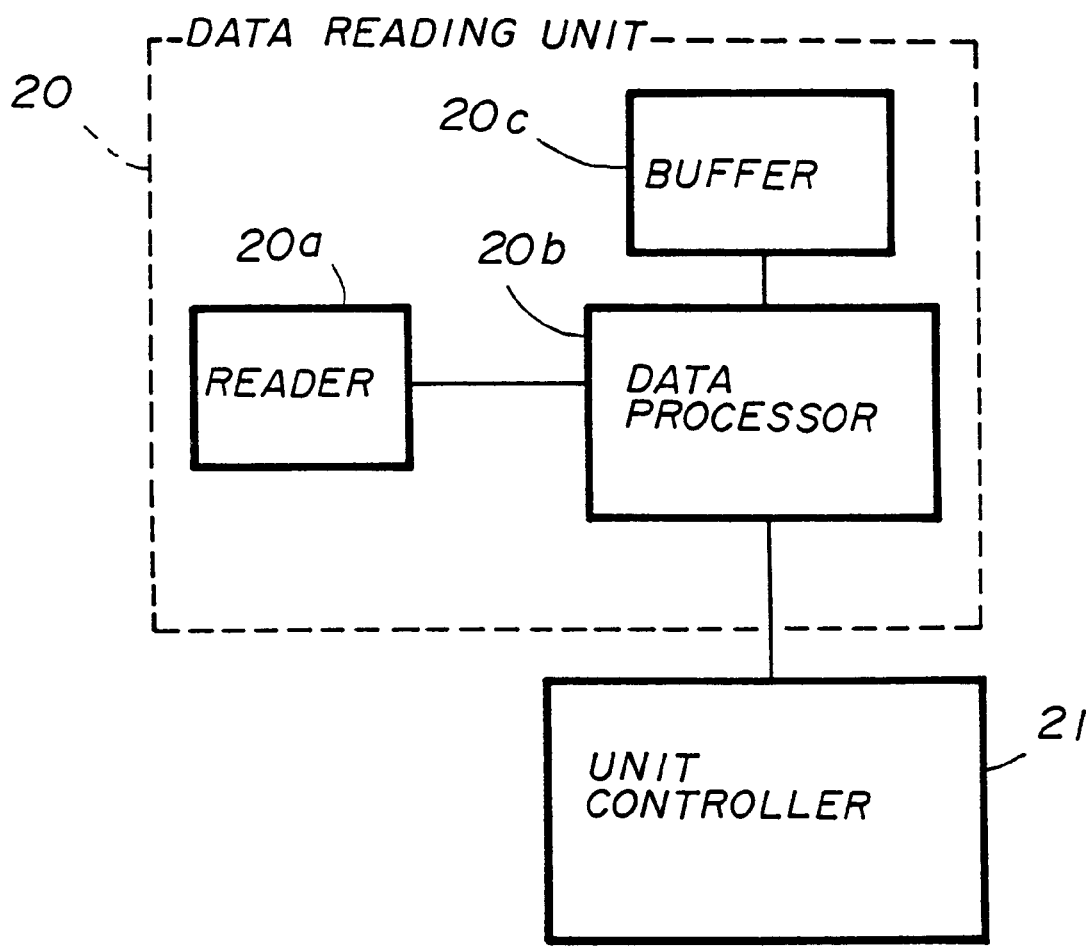
FIG. 8 is a system block diagram showing an embodiment of the recording medium reading apparatus according to the present invention.

FIG. 8 is a system block diagram showing an embodiment of the recording medium reading apparatus according to the present invention. A ticket reading apparatus shown in FIG. 8 includes a data reading unit 20 and a unit controller 21. The data reading unit 20 includes a reader 20a, a data processor 20b and a data storage buffer 20c.

The reader 20a of the data reading unit 20 reads the bar code data from the ticket 30 by a known means such as a bar code reader. The data processor 20b carries out a reproducing process with respect to the bar code data read by the reader 20a. The data storage buffer 20c stores image data of the bar code data read by the reader 20a. The data reading unit 20 reproduces the multiplexed bar code data read from the ticket 30 into the original bar code data. The reproduced bar code data from the data processor 20b are supplied to the unit controller 21 which determines whether or not the ticket 30 is a winning ticket based on the reproduced bar code data, and makes a pay-off process or the like with respect to the winning ticket.

Figure 9:
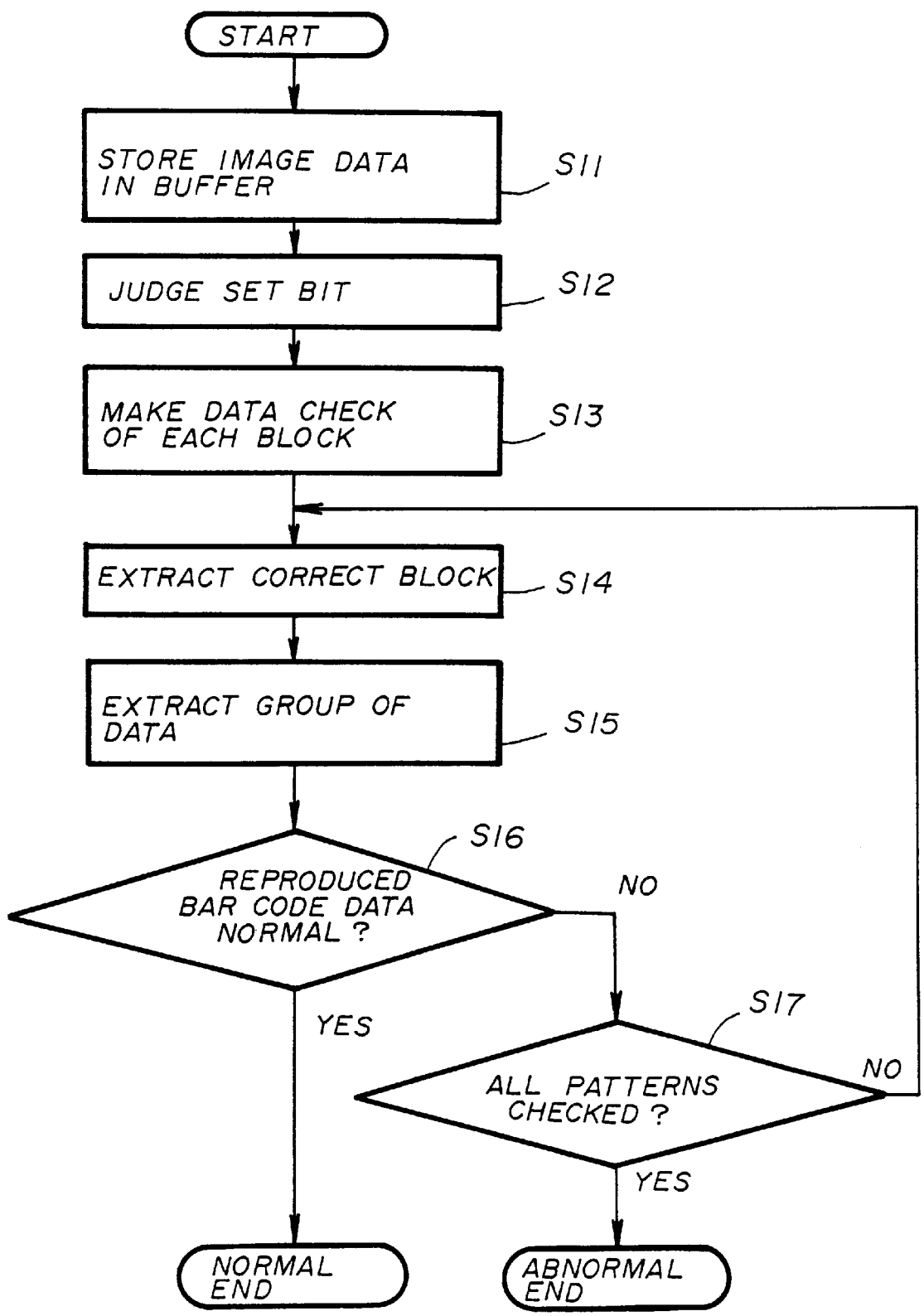
FIG. 9 is a flow chart for explaining the operation of the recording medium reading apparatus shown in FIG. 8.

FIG. 9 is a flow chart for explaining the operation of the recording medium reading apparatus shown in FIG. 8.

In a step S11, the data processor 20b receives from the reader 20a the bar code data read from the ticket 30, and stores the image data of the read bar code data into the data storage buffer 20c. In the bar code data read from the ticket 30, the multiplexed blocks are arranged in the predetermined combination patterns such as those shown in FIG. 3, for example. In a step S12, the data processor 20b reads the image data of the bar code data from the data storage buffer 20c, and decides whether or not set bits exist. In other words, the step S12 decides whether each bit corresponds to a black pixel or a white (blank) pixel of the image data. In a step S13, the data processor 20b generates digital data based on the existence of the set bits detected by the step S12, and checks the data of each block by making a parity check or the like.

In a step S14, the data processor 20b extracts the correct blocks from the digital data generated by the step S13. In a step S15, the data processor 20b extracts from the extracted blocks a group of data corresponding to the predetermined combination pattern in which the multiplexed. blocks are arranged. In the case where the blocks B1 through B4 are multiplexed and arranged in the predetermined combination patterns of 4 blocks as shown in FIG. 3, the step S15 extracts a group of data corresponding to the blocks B1 through B4 having the correct data based on the predetermined combination pattern. In addition, the step S15 reproduces the bar code data based on the extracted group of data corresponding to the blocks B1 through B4 having the correct data.

Then, in a step S16, the data processor 20b carries our a data check, such as a sum check, with respect to the reproduced bar code data, and decides whether or not a result of the data check is normal. The process of the data processor 20b ends normally if the decision result in the step S16 is YES.

On the other hand, if the result of the data check is abnormal and the decision result in the step S16 is NO, the data processor 20b checks in a step S17 whether or not all patterns are checked. If the decision result in the step S17 is NO, the process returns to the step S14 so as to extract the correct blocks B1 through B4 in the step S14, and to extract a group of data corresponding to the correct data blocks B1 through B4 based on the predetermined combination pattern and reproduce the bar code data in the step S15, similarly as described above.

If the decision result in the step S17 is YES, it means that a group of data corresponding to the correct blocks B1 through B4 cannot be obtained even by repeating the above described steps S14 through S17. Hence, the process of the data processor 20b makes an abnormal end if the decision result in the step S17 is YES. This abnormal end is notified to the unit controller 21 so that an indication by display or sound may be made by a known means to indicate that the bar code data cannot be read from the ticket 30.

In the embodiments described above, the ticket 30 is used as the recording medium. However, the recording medium is not limited to a pool ticket, and may be any type of recording medium recorded with digitally coded signals, such as lottery tickets and voting cards. In addition, the digitally coded signals are not limited to the bar codes, and any suitable digitally coded signals or data may be recorded on the recording medium.

In the case of the ticket 30 printed with the bar code data, the reader 20a of the data reading unit 20 reads the bar code data optically from the ticket 30 using a known means. However, in a case where the ticket is magnetically, magneto-optically or optically recorded with digitally coded signals, the reader 20a of the data reading unit 20 may be constructed to magnetically, magneto-optically or optically read the digitally coded signals by using a known means.

Further, the present invention is not limited to these embodiments, but various variations and modifications may be made without departing from the scope of the present invention.

What is claimed is:

1. An apparatus for issuing a recording medium recorded with digitally coded signals, comprising:

processing means for dividing digital data into a plurality of blocks consisting solely of said digital data, multiplexing each of the blocks and arranging multiplexed blocks in predetermined combination patterns formed of rows and columns which extend in mutually perpendicular directions, so that identical information is arranged in different ways in each of the rows and each of the columns; and recording means, coupled to said processing means, for recording the digitally coded signals on the recording medium, the digitally coded signals being made up solely of the multiplexed blocks arranged in the predetermined combination patterns and received from said processing means.

2. The apparatus as claimed in claim 1, wherein said recording means records the digitally coded signals in a form of bar codes.

3. The apparatus as claimed in claim 1, wherein said recording medium is selected from a group consisting of pool tickets, lottery tickets and voting cards.

4. The apparatus as claimed in claim 1, wherein said processing means arranges the multiplexed blocks in the predetermined combination patterns of N blocks, where N is an integer greater than 1.

5. An apparatus as recited in claim 1, wherein the multiplexed blocks in each of the columns and rows are arranged differently in adjacent rows and columns, but indicate identical information over a predetermined range of blocks.

6. An apparatus for reading digitally coded signals from a recording medium, comprising:

reading means for reading the digitally coded signals from the recording medium, the digitally coded signals being made up solely of digital data which are divided into a plurality of blocks consisting solely of said digital data and each of the blocks is multiplexed so that multiplexed blocks are arranged in predetermined combination patterns formed of rows and columns which extend in mutually perpendicular directions, so that identical information is arranged in different ways in each of the rows and each of the columns; and processing means, coupled to said reading means, for reproducing the digital data from the digitally coded signals received from the reading means by extracting the blocks and rearranging the extracted blocks.

7. The apparatus as claimed in claim 6, wherein said processing means comprises:

means for extracting blocks having correct data out of the digitally coded signals read by said reading means; and means for rearranging the extracted blocks having the correct data, to thereby reproduce the digital data.

8. The apparatus as claimed in claim 6, wherein said recording medium is recorded with the digitally coded signals in a form of bar codes.

9. The apparatus as claimed in claim 6, wherein said recording medium is selected from a group consisting of pool tickets, lottery tickets and voting cards.

10. The apparatus as claimed in claim 6, wherein said recording medium is recorded with the multiplexed blocks in the predetermined combination patterns of N blocks, where N is an integer greater than 1.

11. An apparatus as recited in claim 6, wherein the multiplexed blocks in each of the columns and rows are arranged differently in adjacent rows and columns, but indicate identical information over a predetermined range of blocks.

12. An apparatus as recited in claim 6, wherein said reading means reads all of the blocks in all of the rows and columns, and wherein said processing means is responsive to all of the blocks.

13. A recording medium comprising:

a data region; and digitally coded signals recorded in said data region, wherein said digitally coded signals are made up solely of digital data which are divided into a plurality of blocks consisting solely of said digital data and each of the blocks is multiplexed so that the multiplexed blocks are arranged in predetermined combination patterns formed of rows and columns which extend in mutually perpendicular directions, so that identical information is arranged in different ways in each of the rows and each of the columns.

14. The recording medium as claimed in claim 13, wherein said digitally coded signals are recorded in said data region in a form of bar codes.

15. The recording medium as claimed in claim 13, wherein said recording medium is selected from a group consisting of pool tickets, lottery tickets and voting cards.

16. A recording medium as recited in claim 13, wherein the multiplexed blocks in each of the columns and rows are arranged differently in adjacent rows and columns, but indicate identical information over a predetermined range of blocks.

17. An apparatus for reading information from a recording medium, comprising:

a reading unit to read digitally coded signals from the recording medium corresponding to data that has been divided into a plurality of blocks consisting solely of said information that are each multiplexed and arranged in predetermined combination patterns extending in different directions with identical information arranged differently in each substantially continuous linear arrangement of the blocks; and a processing unit to extract blocks from the read digitally coded signals corresponding to the data using more than one of the predetermined combination patterns and rearranging the extracted blocks to reproduce the data.

18. An apparatus as recited in claim 17, wherein the multiplexed blocks are arranged in columns and rows with different arrangements in adjacent rows and columns, but indicate identical information over a predetermined range of blocks.

19. An apparatus as recited in claim 17, wherein said reading unit reads all of the blocks in all of the different directions, and wherein said processing unit is responsive to all of the blocks.

20. An apparatus for issuing a recording medium having data recorded thereon, comprising:

a processing unit to divide the data into a plurality of blocks consisting solely of said data and to multiplex each of the blocks and arrange the multiplexed blocks in predetermined combination patterns extending in different directions with identical information arranged differently in each substantially continuous linear arrangement of the blocks, to form digitally coded signals; and a recording unit to record the digitally coded signals from the processing unit onto the recording medium so that data contents of blocks corresponding to the data is located in more than one of the predetermined combination patterns of the blocks.

21. An apparatus as recited in claim 20, wherein the multiplexed blocks are arranged in columns and rows with different arrangements in adjacent rows and columns, but indicate identical information over a predetermined range of blocks.

22. An apparatus for recording data onto and reading data from a recording medium, comprising:

a processing unit to divide the data into a plurality of blocks consisting solely of said data and to multiplex each of the blocks and arrange the multiplexed blocks in predetermined combination patterns extending in different directions with identical information arranged differently in each substantially continuous linear arrangement of the blocks, to form digitally coded signals;

a recording unit to record the digitally coded signals onto the recording medium; and a reading unit to read the recorded digitally coded signals from the recording medium, extract specific blocks corresponding to the data, and rearrange the extracted blocks to reproduce the data, wherein data contents of the specific blocks corresponding to the data is read from blocks other than the specific blocks in response to the specific blocks not being read.

23. An apparatus as recited in claim 22, wherein the multiplexed blocks are arranged in columns and rows with different arrangements in adjacent rows and columns, but indicate identical information over a predetermined range of blocks.

* * * * *